(12) United States Patent
Diehl et al.

(10) Patent No.: US 9,321,041 B2
(45) Date of Patent: Apr. 26, 2016

(54) PROCESS FOR HYDROTREATING A HYDROCARBON CUT WITH A BOILING POINT OF MORE THAN 250° C. IN THE PRESENCE OF A SULPHIDE CATALYST PREPARED USING A CYCLIC OLIGOSACCHARIDE

(75) Inventors: Fabrice Diehl, Lyons (FR); Elodie Devers, Lyons (FR); Karin Marchand, Lyons (FR); Bertrand Guichard, Izeaux (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 441 days.

(21) Appl. No.: 13/813,016

(22) PCT Filed: Jun. 24, 2011

(86) PCT No.: PCT/FR2011/000368
§ 371 (c)(1),
(2), (4) Date: Apr. 4, 2013

(87) PCT Pub. No.: WO2012/022850
PCT Pub. Date: Feb. 23, 2012

(65) Prior Publication Data
US 2013/0186806 A1 Jul. 25, 2013

(30) Foreign Application Priority Data
Jul. 29, 2010 (FR) .................................. 10 03192

(51) Int. Cl.
| | | |
|---|---|---|
| *B01J 23/76* | (2006.01) | |
| *C10G 45/08* | (2006.01) | |
| *B01J 27/19* | (2006.01) | |
| *B01J 23/652* | (2006.01) | |
| *B01J 23/85* | (2006.01) | |
| *B01J 23/882* | (2006.01) | |
| *B01J 23/883* | (2006.01) | |
| *B01J 23/94* | (2006.01) | |
| *B01J 35/00* | (2006.01) | |
| *B01J 37/08* | (2006.01) | |
| *B01J 37/20* | (2006.01) | |
| *B01J 38/14* | (2006.01) | |
| *C10G 45/10* | (2006.01) | |
| *B01J 23/54* | (2006.01) | |
| *B01J 27/186* | (2006.01) | |
| *B01J 21/04* | (2006.01) | |
| *B01J 37/00* | (2006.01) | |
| *B01J 37/02* | (2006.01) | |

(52) U.S. Cl.
CPC ................ *B01J 27/19* (2013.01); *B01J 23/652* (2013.01); *B01J 23/85* (2013.01); *B01J 23/882* (2013.01); *B01J 23/883* (2013.01); *B01J 23/94* (2013.01); *B01J 35/002* (2013.01); *B01J 37/0203* (2013.01); *B01J 37/086* (2013.01); *B01J 37/20* (2013.01); *B01J 38/14* (2013.01); *C10G 45/08* (2013.01); *C10G 45/10* (2013.01); *B01J 21/04* (2013.01); *B01J 37/0009* (2013.01); *B01J 37/0201* (2013.01); *C10G 2300/1055* (2013.01); *C10G 2300/202* (2013.01); *C10G 2300/301* (2013.01); *C10G 2300/4018* (2013.01); *C10G 2400/04* (2013.01)

(58) Field of Classification Search
CPC ...... B01J 27/043; B01J 27/047; B01J 27/051; B01J 27/0515; B01J 27/132; B01J 27/14; B01J 27/186; B01J 27/188; B01J 27/19; B01J 23/75; B01J 23/755; B01J 23/85; B01J 23/88; B01J 23/882; B01J 23/883; B01J 23/54; B01J 23/76
See application file for complete search history.

(56) References Cited

U.S. PATENT DOCUMENTS

| | | | |
|---|---|---|---|
| 4,426,292 A | | 1/1984 | Wernick et al. |
| 2008/0269533 A1 | | 10/2008 | Chang et al. |
| 2009/0074641 A1 | | 3/2009 | Lewis et al. |
| 2009/0298677 A1 | | 12/2009 | Radlowski et al. |
| 2012/0093703 A1* | | 4/2012 | Lewis et al. ................ 423/213.2 |

FOREIGN PATENT DOCUMENTS

WO     2007/070394 A2     6/2007

OTHER PUBLICATIONS

Weisser, O. et al. (1973) Sulphide Catalysts, Their Properties and Applications, Pergamon, 506 pgs [Office action cites p. 19].*
Search Report for FR 1003192 (Mar. 15, 2011).

* cited by examiner

*Primary Examiner* — Brian McCaig
(74) *Attorney, Agent, or Firm* — Millen, White, Zelano and Branigan, P.C.

(57) ABSTRACT

Preparation of a catalyst having at least one metal from group VIII, at least one metal from group VIB and at least one support; in succession:
i) one of
i1) contacting a pre-catalyst with metal from group VIII, metal from group VIB and support with a cyclic oligosaccharide naming at least 6 α-(1,4)-bonded glucopyranose subunits;
i2) contacting support with a solution containing a precursor of metal from group VIII, a precursor of said metal from group VIB and a cyclic oligosaccharide composed of at least 6 α-(1,4)-bonded glucopyranose subunits; or
i3) contacting support with a cyclic oligosaccharide composed of at least 6 α-(1,4)-bonded glucopyranose subunits followed by contacting solid derived therefrom with a precursor of metal from group VIII and a precursor of metal from group VIB.

15 Claims, No Drawings

PROCESS FOR HYDROTREATING A HYDROCARBON CUT WITH A BOILING POINT OF MORE THAN 250° C. IN THE PRESENCE OF A SULPHIDE CATALYST PREPARED USING A CYCLIC OLIGOSACCHARIDE

FIELD OF THE INVENTION

The present invention relates to a novel method for preparing a catalyst for use in processes for the hydrotreatment of hydrocarbon feeds containing heteroatoms such as sulphur, nitrogen or metals and having a boiling point of 250° C. or more.

PRIOR ART

A catalyst for the hydrotreatment of hydrocarbon cuts is usually intended to eliminate unwanted compounds, especially sulphur-containing compounds and nitrogen-containing compounds, and possibly metals contained therein in order, for example, to obtain an oil product which complies with the required specifications (sulphur content, aromatics content, etc) for a given application (automobile fuel, gasoline or gas oil, domestic fuel, jet fuel). It may also act to pre-treat said hydrocarbon cuts in order to eliminate impurities therefrom before they undergo various transformation processes to modify their physic-chemical properties, for example by using reforming processes, processes for hydrocracking vacuum distillates, or processes for catalytically cracking, hydroconverting and hydrotreating atmospheric or vacuum residues.

The increasing severity of automobile pollution regulations in the European Community (Official Journal of the European Union, L76, 22 Mar. 2003, Directive 2003/70/CE, pages L76/10-L76/19) has forced refiners to substantially reduce the quantity of sulphur in diesel fuels and gasolines (to a maximum of 10 parts per million by weight (ppm) of sulphur on 1 Jan. 2009, as opposed to 50 ppm on 1 Jan. 2005). Further, refiners have been forced to use feeds which are ever more refractory to hydrotreatment processes, firstly because crudes are steadily becoming heavier and heavier and thus contain more and more impurities, and secondly because of the increase in conversion processes in the refineries. They generate cuts which are more difficult to hydrotreat than cuts deriving directly from atmospheric distillation. As an example, mention may be made of the gas oil cut from catalytic cracking, also known as LCO (light cycle oil) as a reference to its high aromatics compounds content. Such more refractory cuts are, for example, co-treated with the gas oil cut from atmospheric distillation; they require catalysts having hydrodesulphurization and hydrogenating functions which are greatly improved compared with traditional catalysts to reduce the quantity of aromatics in order to obtain a density and cetane index which comply with specifications.

The composition and use of hydrotreatment catalysts have been described particularly well in the article by B S Clausen, H T Topsøe, F E Massoth in the publication "Catalysis Science and Technology", 1996, volume 11, Springer-Verlag. The active phase of hydrotreatment catalysts is constituted by a "mixed" sulphide phase constituted by sheets of molybdenum disulphide (or respectively tungsten) embellished with promoter atoms (usually cobalt or nickel) at the periphery. This phase has been identified by Mössbauer spectroscopy, and activity-mixed phase CoMoS correlations have been established, as can be seen in the article by H Topsøe, B S Clausen, Applied Catalysis 25 (1986) 273. The synthesis of hydrotreatment catalysts is a series of unitary steps each leading to secondary products, frequently unwanted, which reduce the yield of "mixed" CoMoS phase (respectively NiMoS, NiWS). Thus, during impregnation and maturation steps, it has been shown that adsorption of polyoxometallates at the surface of the alumina is accompanied by a dissolution-reprecipitation process resulting in the formation of co-precipitates of the hydrotalcite, cobalt aluminate type, $CoAl_2O_4$, and by a surface phase of the aluminium molybdate type, $Al_2(MoO_4)_3$ type, as discussed in the article by X Carrier, J F Lambert, M Che in JACS in 1997 (JACS 119 (42) page 10137). The use of solutions of metals from group VIB, VIII and phosphorus-containing compounds in the form of Keggin, Strandberg or Anderson heteropolyanions of greater solubility has meant that the occurrence of such secondary products linked to the interaction of the support with the precursors of the active phase has been able to be reduced.

One solution to improving the activity of hydrotreatment catalysts is to enhance their active phase content. However, when calcining catalysts, sintering phenomena may occur and result in the appearance of unwanted crystalline phases. They are linked to the surface density of the active phase and to the calcining temperature. X-ray diffraction analyses can provide a semi-quantitative assay of the quantity of crystalline $CoMoO_4$ detected (ratio of the areas of the peaks at 26° between the analyzed sample and a reference sample the value of which is taken as a reference and equal to 100%). Various authors have shown that after sulphurization, $CoMoO_4$ results in a mixture of phases essentially constituted by $CoMo_2S_4$, $Co_2Mo_3O_8$ and $Co_nS_{n-1}$ which, according to G Hagenbach, P Courty and B Delmon in Journal of Catalysis 23 (1971) 295, should have a very low activity. The absence of $CoMoO_4$ is thus an important positive point since this phase does not significantly contribute to the catalytic activity and the skilled person is therefore incited to ensure good dispersion of the active phase.

Adding an organic compound to the hydrotreatment catalysts to improve their activity is now well known to the skilled person. Many patents and patent applications describe the use of various families of organic compounds such as mono-, di- or poly-alcohols which are optionally etherified (WO 96/41848, WO 01/76741, U.S. Pat. No. 4,012,340, U.S. Pat. No. 3,954,673). Catalysts modified with C2-C14 monoesters have been described in patent applications EP 0 466 568 and EP 1 046 424.

EP 0 601 722 A1 may also be cited; it proposes the preparation of dried hydrotreatment catalysts by carrying out the impregnation of non-cyclic mono-, di- or poly-saccharaides such as glucose, fructose, maltose, lactose or sucrose. It is also possible to cite patent application WO2007/070394 which discloses a process for the preparation of catalysts for the hydrotreatment of carbonaceous feeds using sugars, including lactose (with formula $C_{10}H_{22}O_{11}$; it is a non-cyclic diholoside) as a complexing agent to improve the activity of said catalysts for hydrotreatment, hydrodesulphurization and hydrodenitrogenation. The preparation of these prior art hydrotreatment catalysts ends in a heat treatment carried out at a temperature which is sufficiently low not to decompose the organic compounds used during the preparation before employing said catalysts in a hydrotreatment process.

However, those modifications provided by the impregnation of organic compounds when preparing the hydrotreatment catalysts cannot always increase the catalyst performance sufficiently to comply with specifications, in particular those imposed on refiners concerning the sulphur content of fuels which are constantly being tightened. In addition, any other synthesis methodologies leading to innovative interactions between an oxide support and the precursors of the active phases are of great interest.

SUMMARY AND ADVANTAGE OF THE INVENTION

The present invention concerns a process for preparing a catalyst comprising at least one metal from group VIII, at least one metal from group VIB and at least one support formed from at least one oxide, said process comprising, in succession, at least:
i) at least one of the steps selected from:
   i1) at least one step for bringing at least one pre-catalyst comprising at least said metal from group VIII, at least said metal from group VIB and at least said support into contact with at least one organic compound formed from at least one cyclic oligosaccharide composed of at least 6 α-(1,4)-bonded glucopyranose subunits;
   i2) at least one step for bringing at least said support into contact with at least one solution containing at least one precursor of at least said metal from group VIII, at least one precursor of at least said metal from group VIB and at least one organic compound formed from at least one cyclic oligosaccharide composed of at least 6 α-(1,4)-bonded glucopyranose subunits; and
   i3) at least one first step for bringing at least said support into contact with at least one organic compound formed from at least one cyclic oligosaccharide composed of at least 6 α-(1,4)-bonded glucopyranose subunits followed by at least one second step for bringing the solid derived from said first step into contact with at least one precursor of at least said metal from group VIII and at least one precursor of at least said metal from group VIB;
ii) at least one drying step; and
iii) at least one heat treatment step to decompose said organic compound.

The preparation process of the invention advantageously comprises at least one sulphurization step iv) carried out after carrying out said step iii).

The catalyst in the sulphurized form prepared using the process of the invention is advantageously used in a process for the hydrotreatment of a hydrocarbon feed with a boiling point of 250° C. or more and comprising at least one heteroatom. In particular, said catalyst in the sulphurized form is used in a process for the hydrodesulphurization of a gas oil cut and in a process for the hydrotreatment of a heavy hydrocarbon feed with a boiling point of 370° C. or more.

Surprisingly, it has been discovered that a catalyst prepared using the process of the invention results in improved catalytic performances, especially in terms of activity, when it is used for the hydrotreatment of hydrocarbon feeds with a boiling point of 250° C. or more and comprising at least one heteroatom. In particular, it has an improved activity for the hydrodesulphurization of a gas oil feed and for the hydrotreatment of heavy feeds with a boiling point of more than 370° C.

DESCRIPTION OF THE INVENTION

The present invention concerns a process for preparing a catalyst comprising at least one metal from group VIII, at least one metal from group VIB and at least one support formed from at least one oxide, said process comprising, in succession, at least:
i) at least one of the steps selected from:
   i1) at least one step for bringing at least one pre-catalyst comprising at least said metal from group VIII, at least said metal from group VIB and at least said support into contact with at least one organic compound formed from at least one cyclic oligosaccharide composed of at least 6 α-(1,4)-bonded glucopyranose subunits;
   i2) at least one step for bringing at least said support into contact with at least one solution containing at least one precursor of at least said metal from group VIII, at least one precursor of at least said metal from group VIB and at least one organic compound formed from at least one cyclic oligosaccharide composed of at least 6 α-(1,4)-bonded glucopyranose subunits; and
   i3) at least one first step for bringing at least said support into contact with at least one organic compound formed from at least one cyclic oligosaccharide composed of at least 6 α-(1,4)-bonded glucopyranose subunits followed by at least one second step for bringing the solid derived from said first step into contact with at least one precursor of at least said metal from group VIII and at least one precursor of at least said metal from group VIB;
ii) at least one drying step; and
iii) at least one heat treatment step to decompose said organic compound.

The active phase of the catalyst prepared using the process of the invention comprises at least one metal from group VIII of the periodic classification of the elements and at least one metal from group VIB of the periodic classification of the elements, said metal(s) from group VIII and said metal(s) from group VIB providing the hydrodehydrogenating function of said catalyst. Preferably, said catalyst comprises phosphorus. More preferably, said catalyst the composition of which comprises or does not comprise phosphorus comprises a dopant selected from boron and fluorine, used alone or as a mixture. The dopant, although not of itself having a catalytic nature, can increase the catalytic activity of the metals from groups VIB and VIII. The phosphorus and the dopant preferably comprised in the composition of said catalyst form part of the active phase of the catalyst prepared in accordance with the process of the invention.

In general, the total quantity of hydrodehydrogenating elements, i.e. of metal(s) from group VIII and metal(s) from group VIB, is more than 6% by weight of oxides of metals from groups VIB and VIII with respect to the total catalyst weight; preferably, it is in the range 10% to 50% by weight of oxides of metals from groups VIB and VIII with respect to the total catalyst weight. The quantity of metal(s) from group VIB is in the range 4% to 40% by weight of oxide(s) of metal(s) from group VIB with respect to the total catalyst weight, preferably in the range 8% to 35% by weight and more preferably in the range 10% to 30% by weight of oxide(s) of metal(s) from group VIB with respect to the total catalyst weight. The quantity of metal(s) from group VIII is in the range 1% to 10% by weight of oxide(s) of metal(s) from group VIII with respect to the total catalyst weight, preferably in the range 1.5% to 9% by weight and more preferably in the range 2% to 8% by weight of oxide(s) of metal(s) from group VIII with respect to the total catalyst weight. The percentages by weight of metals from groups VIII and VIB indicated above are expressed with respect to the total weight of catalyst derived from said step iii) of the preparation process of the invention. Said catalyst is thus in the oxide form.

The metal from group VIB present in the active phase of the catalyst prepared in accordance with the process of the invention is preferably selected from molybdenum, tungsten and a mixture of these two elements; highly preferably, the metal from group VIB is molybdenum. The metal from group VIII present in the active phase of the catalyst prepared in accordance with the process of the invention is preferably selected from non-noble metals from group VIII of the periodic classification of the elements. Preferably, said metal from group VIII is selected from cobalt, nickel and a mixture of these two elements.

In accordance with the invention, the hydrodehydrogenating function is selected from the group formed from a combination of cobalt-molybdenum, nickel-molybdenum, nickel-cobalt-molybdenum, nickel-molybdenum-tungsten and nickel-tungsten elements.

The molar ratio of the metal(s) from group VIII to the metal(s) from group VIB in the oxide catalyst derived from said step iii) is preferably in the range 0.1 to 0.8, highly preferably in the range 0.2 to 0.6, and still more preferably in the range 0.3 to 0.5.

When the catalyst contains phosphorus, the quantity of phosphorus in said oxide catalyst obtained from said step iii) is preferably in the range 0.1% to 20% by weight of $P_2O_5$, more preferably in the range 0.2% to 15% by weight of $P_2O_5$, highly preferably in the range 0.3% to 10% by weight of $P_2O_5$. The molar ratio of phosphorus to the metal(s) from group VIB in the oxide catalyst from said step iii) is 0.05 or more, preferably 0.1 or more, more preferably in the range 0.15 to 0.6, still more preferably in the range 0.15 to 0.5.

When the catalyst contains boron as a dopant, the boron content in said oxide catalyst obtained from said step iii) is preferably in the range 0.1% to 30% by weight of boron oxide, more preferably in the range 0.2% to 15% by weight of boron oxide, and highly preferably in the range 0.2% to 10% by weight of boron oxide.

When the catalyst contains fluorine as a dopant, the fluorine content in said oxide catalyst obtained from said step iii) is preferably in the range 0.1% to 20% by weight of fluorine, more preferably in the range 0.2% to 15% by weight of fluorine, highly preferably in the range 0.2% to 10% by weight of fluorine.

The support for the catalyst prepared using the process of the invention is formed from at least one oxide comprising at least 50% by weight of alumina. In particular, said support is selected from transition aluminas and silica-aluminas with a weight content of silica in said support of at most 15% by weight. The term "transition alumina" means an alpha phase alumina, a delta phase alumina, a gamma phase alumina or a mixture of aluminas from said various phases. Said support is advantageously constituted either by one or by a mixture of transition aluminas or by a silica-alumina with a silica content in said support of at most 15% by weight. Said support is preferably free of the presence of zeolitic crystals. The pore volume of the support is generally in the range 0.4 to 1.5 cm³/g, preferably in the range 0.5 to 1.2 cm³/g. The specific surface area of the support is generally in the range 100 to 400 m²/g, preferably in the range 150 to 350 m²/g. Said porous support is shaped such that it advantageously is in the form of beads, extrudates, pellets or irregular and non-spherical agglomerates the specific shape of which may be the result of a crushing step. Highly advantageously, said support is in the form of beads or extrudates. Said support is highly advantageously calcined at a temperature preferably in the range 300° C. to 600° C. after shaping. In a preferred embodiment, said support comprises, in part, metals from groups VIB and VIII and/or in part, phosphorus and/or at least in part, a dopant.

In accordance with said step i) of the preparation process of the invention, said catalyst is prepared in the presence of at least one organic compound formed from at least one cyclic oligosaccharide composed of at least 6 α-(1,4)-bonded glucopyranose subunits. A spatial representation of a glucopyranose subunit is given below:

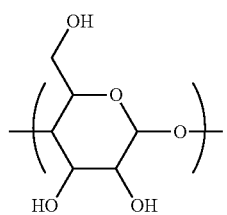

Said organic compound is preferably selected from cyclodextrins, substituted cyclodextrins, polymerized cyclodextrins and mixtures of cyclodextrins. Cyclodextrins are a family of cyclic oligosaccharides composed of α-(1,4)-bonded glucopyranose subunits. They are cage molecules. In accordance with the process of the invention, the cyclodextrins preferably used for carrying out said step i) of the preparation process of the invention, i.e. for carrying out at least one of the steps selected from i1), i2) and i3), are α-cyclodextrin, β-cyclodextrin and γ-cyclodextrin respectively composed of 6, 7 and 8 α-(1,4)-bonded glucopyranose subunits. Developed representations of α-cyclodextrin, β-cyclodextrin and γ-cyclodextrin are given below. Preferably, to carry out said step i), β-cyclodextrin is used, composed of 7 α-(1,4)-bonded glucopyranose subunits. Cyclodextrins are commercially available compounds.

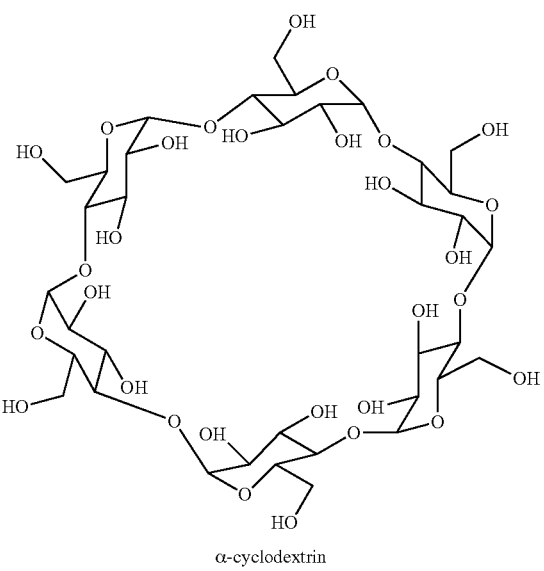

α-cyclodextrin

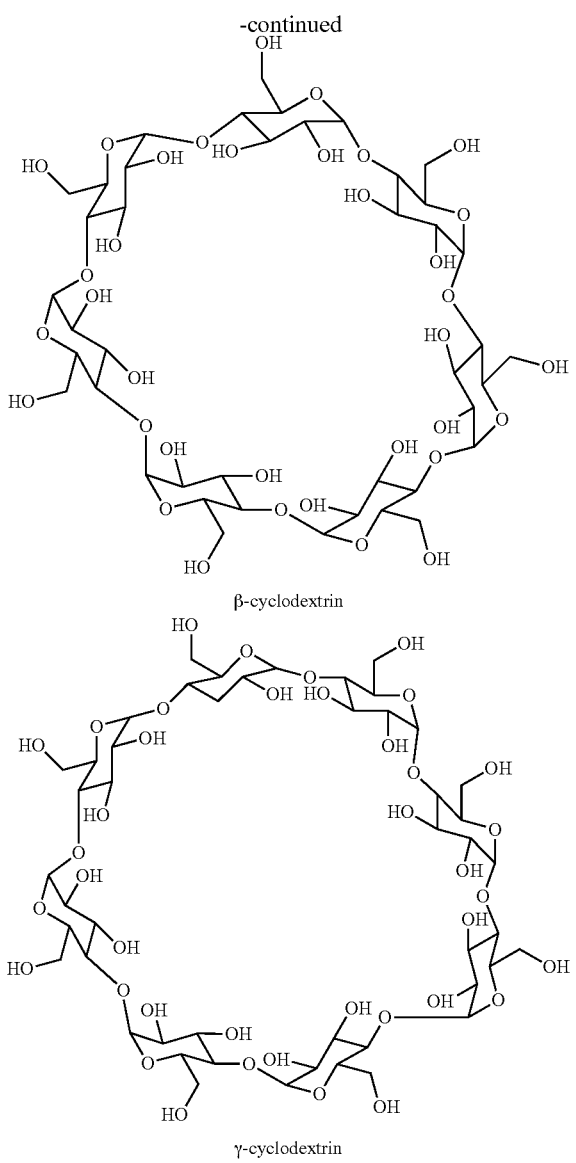

β-cyclodextrin

γ-cyclodextrin

The substituted cyclodextrins advantageously employed to carry out said step i) of the preparation process of the invention, i.e. to carry out at least one of the steps selected from i1), i2) and i3), are constituted by 6, 7 or 8 α-(1,4)-bonded glucopyranose subunits, wherein at least one is mono- or polysubstituted. The substituents may be attached to one or more hydroxyl group(s) present in the molecule, namely to hydroxyl groups bonded directly to the cycle of a glucopyranose unit and/or to the hydroxyl bonded to the $CH_2$ group itself bonded to the cycle of a glucopyranose unit. More preferably, said substituted cyclodextrins carry one or more substituents, which may be identical or different, selected from saturated or unsaturated alkyl radicals, which may or may not be functionalized, and ester, carbonyl, carboxyl, carboxylate, phosphate, ether, polyether, urea, amide, amine, triazole or ammonium functions. Preferred substituted cyclodextrins are methylated, ethylated, propylated and allyl (i.e. having a function with the semi-developed formula —$CH_2$—CH=$CH_2$) cyclodextrins, succinylated (i.e. having a function with the semi-developed formula R—OCO—$CH_2$—$CH_2$COOH) cyclodextrins, carboxylated, carboxymethylated, acetylated, 2-hydroxypropylated and polyoxyethylenated cyclodextrins. The cyclodextrin mono- or poly-substituents may also be a monosaccharide or disaccharide molecule such as a molecule of maltose, glucose, fructose or saccharose.

Particularly advantageous substituted cyclodextrins for carrying out said step i) of the process of the invention, i.e. for carrying out at least one of the steps selected from i1), i2) and i3), are hydroxypropyl beta-cyclodextrin and methylated beta-cyclodextrins.

The polymerized cyclodextrins which are advantageously employed for carrying out said step i), i.e. for carrying out at least one of the steps selected from i1), i2) and i3), are polymers wherein the monomers are each constituted by a cyclic oligosaccharide composed of 6, 7 or 8 α-(1,4)-bonded glucopyranose subunits, which may or may not be substituted. A cyclodextrin in the polymerized form, cross-linked or not, which may advantageously be used to carry out said step i) is, for example, of the type obtained by polymerization of monomers of beta-cyclodextrin with epichlorhydrin or a polyacid.

Advantageous mixtures of cyclodextrins employed in carrying out said step i) of catalyst preparation process of the invention employ substituted or unsubstituted cyclodextrins. Said mixtures could, for example, contain each of the three types of cyclodextrins (alpha, beta and gamma) jointly and in varying proportions.

Introduction of said organic compound, preferably a cyclodextrin and highly preferably beta cyclodextrin, for carrying out said step i) of the process of the invention is such that the molar ratio {(metals from groups (VIII+VIB) in the oxide form present in the active phase of the catalyst obtained at the end of said step iii)/organic compound} is in the range 10 to 300, preferably in the range 25 to 180. The metals from groups VIII and VIB taken into account for the calculation of said molar ratio are the metals introduced to carry out said step i) of the preparation process of the invention and are in the oxide form in the active phase of the catalyst obtained from said step iii). Said metals from groups VIII and VIB may as a consequence be found in the sulphide form: they will be sulphurized prior to carrying out the hydrocracking process described below in the present description.

Contact of said organic compound with said pre-catalyst to carry out said step i1) or respectively with said support for carrying out said step i2) or said step i3) is carried out by impregnation, especially by dry impregnation or excess impregnation, preferably by dry impregnation. Said organic compound is preferably impregnated onto said pre-catalyst (step i1), or respectively onto said support (step i2) or step i3)) after dissolving in an aqueous solution. Impregnation of said organic compound onto said pre-catalyst (step i1)) or respectively onto said support (step i2) or step i3)) is followed by a maturation step then by a drying step, preferably carried out at a temperature in the range 50° C. to 200° C., highly preferably in the range 65° C. to 180° C. and still more preferably in the range 75° C. to 160° C. Said drying step is optionally followed by a calcining step.

In accordance with said step i) of the preparation process of the invention, deposition of at least said metal from group VIII and at least said metal from group VIB onto said support (step i1) or step i2)) or onto said solid comprising said organic compound obtained at the end of said first step in accordance with step i3) may be carried out using any method which is well known to the skilled person, preferably by impregnation of said support (step i1) or step i2)) or of said solid (step i3)) by at least one precursor of said metal from group VIII and at least one precursor of said metal from group VIB present in solution. It may be dry impregnation or excess impregnation using methods which are well known to the skilled person.

Preferably, dry impregnation is carried out, consisting of bringing said support (step i1) or step i2)) or said solid (step i3)) into contact with at least one precursor of said metal from group VIII and at least one precursor of said metal from group VIB present in one or more solutions the total volume of which is equal to the pore volume of the support to be impregnated or of said solid to be impregnated. Said solution(s) contain(s) metallic precursors of the metal from group VIII and of the metal from group VIB at the desired concentration to obtain the desired concentration of hydrodehydrogenating elements in the active phase of the catalyst. Each step for impregnation of said support (step i1) or step i2)) or said solid (step i3)) by at least one precursor of said metal from group VIII and at least one precursor of said metal from group VIB is preferably followed by a maturation step, then by a drying step preferably carried out at a temperature in the range 50° C. to 200° C., highly preferably in the range 65° C. to 180° C. and still more preferably in the range 75° C. to 160° C. Said drying step is optionally followed by a calcining step.

Said metal(s) from group VIII and said metal(s) from group VIB are brought into contact with said support (step i1) or step i2)) or respectively said solid (step i3)) using any metallic precursor which is soluble in aqueous phase or in an organic phase. Preferably, said precursor(s) of said metal(s) from group VIII and said precursor(s) of said metal(s) from group VIII are introduced in aqueous solution.

The precursors of said metal(s) from group VIII are advantageously selected from oxides, hydroxides, hydroxycarbonates, carbonates and nitrates of elements from group VIII. Nickel hydroxycarbonate, cobalt nitrate, cobalt carbonate or cobalt hydroxide are preferably used.

The molybdenum precursors used to carry out said step i) of the process of the invention are well known to the skilled person. As an example, the sources of molybdenum include oxides and hydroxides, molybdic acids and their salts, in particular ammonium salts such as ammonium molybdate, ammonium heptamolybdate, phosphomolybdic acid ($H_3PMo_{12}O_{40}$) and their salts, and possibly silicomolybdic acid ($H_4SiMo_{12}O_{40}$) and corresponding salts. The molybdenum sources may also be any other heteropolycompound of the Keggin, lacunary Keggin, substituted Keggin, Dawson, Anderson or Strandberg type, for example. Preferably, molybdenum trioxide and heteropolyanions of the Strandberg, Keggin, lacunary Keggin or substituted Keggin type which are known to the skilled person are used.

The tungsten precursors used to carry out said step i) of the preparation process of the invention are well known to the skilled person. As an example, the sources of tungsten include oxides and hydroxides, tungstic acids and their salts, in particular ammonium salts such as ammonium tungstate, ammonium metatungstate, phosphotungstic acid ($H_3PW_{12}O_{40}$) and their salts, and possibly silicotungstic acid ($H_4SiW_{12}O_{40}$) and its salts. The tungsten sources may also be any other heteropolycompound of the Keggin, lacunary Keggin, substituted Keggin or Dawson type, for example. Preferably, ammonium oxides and salts such as ammonium metatungstate or heteropolyanions of the Keggin, lacunary Keggin or substituted Keggin type which are known to the skilled person are used.

The preparation process of the invention comprises several implementations.

In accordance with said step i1) of the preparation process of the invention, a first implementation consists of bringing at least one pre-catalyst comprising at least one metal from group VIII, at least one metal from group VIB and at least one support formed from at least one oxide into contact with at least one organic compound formed from at least one cyclic oligosaccharide composed of at least 6 α-(1,4)-bonded glucopyranose subunits. In accordance with the invention, said first implementation is a "post-impregnation" preparation.

In a first variation of said step i1), the pre-catalyst is prepared by depositing at least said metal from group VIII and at least said metal from group VIB onto said support using any method known to the skilled person, preferably by dry impregnation, excess impregnation or by deposition-precipitation using methods well known to the skilled person. The precursors of the metal from groups VIB and VIII may be deposited in one or more impregnations. A maturation step is carried out after each step for impregnation of said metals from groups VIII and VIB. An intermediate drying step, for example carried out at a temperature in the range 50° C. to 200° C. and preferably in the range 75° C. to 160° C., is advantageously carried out between two successive impregnations. After depositing the desired total quantity of metals from groups VIB and VIII, the impregnated solid obtained is dried, for example at a temperature in the range 50° C. to 200° C. and preferably in the range 75° C. to 160° C., and advantageously calcined at a temperature in the range 350° C. to 600° C., preferably in the range 410° C. to 510° C., in order to obtain said pre-catalyst.

In a second variation of said step i1), the pre-catalyst is a catalyst comprising at least one metal from group VIII, at least one metal from group VIB and at least one support formed from at least one oxide, said catalyst having been regenerated to eliminate the coke formed as a result of said catalyst being used in a reaction unit. The spent catalyst is regenerated by combustion of coke, generally by controlling the exothermicity linked to combustion of the coke. The regenerated catalyst used as a pre-catalyst is then brought into contact with at least one organic compound formed from at least one cyclic oligosaccharide composed of at least 6 α-(1,4)-bonded glucopyranose subunits.

Subsequent contact of said organic compound with said pre-catalyst obtained in accordance with the first or second variation of said step i1) is followed by a maturation step then by at least one drying step, which is carried out under the same conditions as those operated for said step ii), and finally by at least one calcining step, which is carried out under the same conditions as those operated for said step iii).

In accordance with said step i2), a second implementation of the preparation process of the invention consists in depositing precursors of said metals from groups VIII and VIB and that of said organic compound onto said support by at least one co-impregnation step, preferably carried out dry. Said second implementation comprises carrying out one or more co-impregnation steps. It is advantageous to carry out impregnation of a portion of the desired total quantity of metals from groups VIB and VIII before or after said co-impregnation step. Each of the co-impregnation steps is followed by a maturation step then by at least one drying step and optionally by at least one calcining step. The last step in depositing the precursors of the metals from groups VIII and VIB and/or said organic compound in order to obtain the catalyst prepared using the process of the invention, preferably the step for co-impregnation when said second implementation only comprises one co-impregnation step as the impregnation step, is followed by at least one drying step which is carried out under the same conditions as those operated for said step ii), and finally by at least one heat treatment step, preferably a calcining step, which is carried out under the same conditions as those operated for said step iii).

In accordance with said step i3), a third implementation of the preparation process of the invention consists in bringing at least said support into contact with at least one organic compound formed from at least one cyclic oligosaccharide composed of at least 6 α-(1,4)-bonded glucopyranose subunits, then of bringing said support impregnated with said organic compound into contact with at least one precursor of at least said metal from group VIII and at least one precursor of at least said metal from group VIB. The first step for bringing at least said support into contact with said organic compound is preferably immediately followed by a maturation step then by at least one drying step and optionally by at least one calcining step before a second step for bringing the solid from said first step into contact with the precursors of the metals from groups VIB and VIII. Advantageously, said first step is followed by several steps for impregnation of precursors of the metals from groups VIII and VIB. The catalyst preparation in accordance with said third implementation is terminated by at least one drying step which is carried out under the same conditions as those operated for said step ii), and finally at least one heat treatment step, preferably a calcining step, which is carried out under the same conditions as those operated for said step iii).

In a particular implementation of the preparation process of the invention, a portion of the total quantity of the metals from groups VIB and/or VIII present in the active phase of the catalyst is introduced at the time of shaping the support. In particular, said metal(s) from group VIB is (are) introduced at the time of shaping said support in a quantity such that at most 10% by weight, preferably at most 5% by weight of said metal(s) from group VIB present in the active phase of the catalyst are introduced at the time of shaping, the remainder of the quantity of group VIB metal(s) being introduced when carrying out said step i) of the preparation process of the invention. Preferably, said metal(s) from group VIB are introduced in part during mixing with an alumina gel selected as the matrix. Preferably, said metal from group VIB is introduced at the same time as the element from group VIII. Advantageously, the metal(s) from group VIB is (are) introduced at the same time as the metal(s) from group VIII.

In accordance with another particular implementation of the preparation process of the invention, the entire quantity of the metals from groups VIB and VIII is introduced after shaping and calcining the support when carrying out said step i) of the preparation process of the invention. Advantageously, the metal(s) from group VIB is (are) introduced at the same time as the metal(s) from group VIII.

The phosphorus which may be present in the active phase of the catalyst is introduced either in its entirety during step i) of the preparation process of the invention or in part when shaping the support, the remainder then being introduced during said step i) of the preparation process of the invention. Highly preferably, the phosphorus is introduced by impregnation of the entire amount or at least a portion during said step i) of the preparation process of the invention and still more preferably, it is introduced as a mixture with at least one of the precursors of the metals from groups VIB and/or VIII during one of the steps selected from steps i1), i2) and i3). Impregnation of phosphorus during said step i) of the preparation process of the invention, in particular when the phosphorus is introduced alone (i.e. in the absence of any other element of the active phase of the catalyst) is followed by a step for drying at a temperature in the range 50° C. to 200° C., preferably in the range 65° C. to 180° C. and more preferably in the range 75° C. to 160° C. The preferred source of phosphorus is orthophosphoric acid, $H_3PO_4$, however its salts and esters such as ammonium phosphates are also suitable. The phosphorus may also be introduced at the same time as the element(s) from group VIB in the form of Keggin, lacunary Keggin, substituted Keggin or Strandberg type heteropolyanions which are well known to the skilled person.

The dopant(s) which may optionally be present in the active phase of the catalyst in the form of boron and/or fluorine, is (are) introduced either in their entirety during step i) of the preparation process of the invention or in their entirety during preparation of the support and preferably during shaping of the support, or partially during the preparation of the support, the remainder then being introduced during said step i) of the preparation process of the invention. Highly preferably, the dopant is introduced by impregnation, in its entirety or partially during said step i) of the preparation process of the invention; still more preferably, it is introduced as a mixture with at least one of the precursors of the metals from groups VIB and/or VIII during one of the steps selected from steps i1), i2) and i3). Impregnation of the dopant during said step i) of the preparation process of the invention, in particular when the dopant is introduced alone (i.e. in the absence of any other element of the active phase of the catalyst) is followed by a step for drying at a temperature in the range 50° C. to 200° C., preferably in the range 65° C. to 180° C. and more preferably in the range 75° C. to 160° C. The source of boron may be boric acid, preferably orthoboric acid $H_3BO_3$, ammonium biborate or pentaborate, boron oxide, or boric esters. The boron may, for example, be introduced using a boric acid solution in a water/alcohol mixture or in a water/ethanolamine mixture. The sources of fluorine which may be used are well known to the skilled person. As an example, fluoride anions may be introduced in the form of hydrofluoric acid or its salts. These salts are formed with alkali metals, ammonium or an organic compound. In this latter case, the salt is advantageously formed by reaction between an organic compound and hydrofluoric acid. The fluorine may be introduced, for example, by impregnation of an aqueous hydrofluoric acid or ammonium fluoride or ammonium difluoride solution.

Said drying step ii) carried out for the preparation of the catalyst in accordance with the process of the invention is carried out at a temperature in the range 50° C. to 200° C., preferably in the range 65° C. to 180° C., and still more preferably in the range 75° C. to 160° C. Said step ii) is preferably carried out for a period in the range 1 to 48 hours, more preferably in the range 1 to 36 hours. Said drying step means that the solvent(s) used during said step i) can be evacuated.

Said drying step is followed by at least one heat treatment step iii) to decompose said organic compound formed from at least one cyclic oligosaccharide composed of at least 6 α-(1, 4)-bonded glucopyranose subunits. Said heat treatment is carried out at a temperature in the range 350° C. to 600° C., preferably in the range 370° C. to 550° C. and more preferably in the range 410° C. to 510° C. It is advantageously carried out in air or in an inert gas in any equipment known to the skilled person for carrying out this type of heat treatment. Preferably, the heat treatment is carried out in air, thereby calcining it. The heat treatment is carried out for a period which is advantageously in the range 1 to 6 hours, preferably in the range 1 to 3 hours.

After carrying out steps i) and ii) of the process of the invention, the catalyst obtained at the end of said step iii) is in the oxide state.

The catalyst preparation process of the invention advantageously comprises at least one step for sulphurization iv) such that the active phase of the catalyst is in the sulphide form in order to use said catalyst in a hydrotreatment process as described below in the present description. Said sulphurization step is carried out after carrying out said step iii). This activation treatment by sulphurization is well known to the skilled person and can be carried out using any method known to the skilled person. Said sulphurization step is carried out by bringing said catalyst from said step iii) of the preparation process of the invention into contact with at least one decomposable organic sulphur-containing compound that can generate $H_2S$ or by bringing said catalyst into direct contact with a gaseous stream of $H_2S$, for example diluted in hydrogen. Said sulphur-containing organic compound is advantageously selected from alkyldisulphides such as dimethyldisulphide (DMDS), alkyl sulphides such as dimethyl sulphide, mercaptans such as n-butylmercaptan, polysulphide compounds of the tertiononylpolysulphide type such as TPS-37 or TPS-54 sold by ARKEMA, or any other compound known to the skilled person for obtaining good catalyst sulphurization. Said sulphurization step iv) may be carried out in situ (i.e. after loading the catalyst into the reaction unit for the hydrotreatment process of the invention described below in the present description) or ex situ (i.e. before loading the catalyst into the reaction unit of the hydrotreatment process of the invention described below in the present description) at a temperature in the range 200° C. to 600° C. and more process in the range 300° C. to 500° C.

The catalyst from said step iv) is at least partially in the sulphide form before carrying out the hydrotreatment process of the invention. It may also comprise a metallic oxide phase which has not been transformed during said sulphurization step iv). Said catalyst is entirely free of said organic compound formed from at least one cyclic oligosaccharide composed of at least 6 α-(1,4)-bonded glucopyranose subunits.

The present invention also concerns a process for the hydrotreatment of a hydrocarbon feed with a boiling point of 250° C. or more and comprising at least one heteroatom, said hydrotreatment process comprising bringing said hydrocarbon feed into contact with at least one sulphide catalyst obtained using the preparation process of the invention.

Said hydrocarbon feed with a boiling point of 250° C. or more treated using the hydrotreatment process of the invention is advantageously selected from gas oils, vacuum gas oils, atmospheric residues, vacuum residues, atmospheric distillates, vacuum distillates, heavy fuels, deasphalted residues or crudes, feeds originating from thermal or catalytic conversion processes, and feeds derived from biomass, oils, waxes and paraffins, said feeds being alone or as a mixture.

Said hydrocarbon feed with a boiling point of 250° C. or more treated in accordance with the hydrotreatment process of the invention comprises at least one heteroatom selected from sulphur, nitrogen and oxygen, taken alone or as a mixture. Preferably, said hydrocarbon feed comprises at least sulphur. Said hydrocarbon feed may also comprise metals, in particular nickel and vanadium. It may also comprise unsaturated compounds, in particular olefins and diolefins, as well as aromatic compounds.

The hydrotreatment process of the invention is intended to eliminate the impurities present in said feed, namely the heteroatom(s) and possibly metals and/or aromatic compounds. In particular, the hydrotreatment process of the invention carries out hydrogenation, hydrodenitrogenation, hydrodearomatization, hydrodesulphurization and/or hydrodemetallization reactions.

The hydrotreatment process of the invention is carried out in the presence of hydrogen and is carried out under the following operating conditions: the temperature is in the range 180° C. to 450° C., preferably in the range 250° C. to 440° C., the total pressure is in the range 0.5 to 30 MPa, preferably in the range 1 to 18 MPa, the hourly space velocity is in the range 0.1 to 20 $h^{-1}$, preferably in the range 0.2 to 5 $h^{-1}$, and the hydrogen/feed ratio, expressed as the volume of hydrogen measured under normal temperature and pressure conditions, per volume of liquid feed is in the range 50 Nl/l to 2000 Nl/l.

In accordance with a particular implementation, said hydrotreatment process of the invention is a process for the hydrodesulphurization of a gas oil cut carried out in the presence of at least one sulphurized catalyst prepared using the process of the invention. Said hydrodesulphurization process (HDS) of the invention is intended to eliminate sulphur-containing compounds present in said gas oil cut so as to comply with environmental regulations which are in force, namely an authorized sulphur content of up to 10 ppm.

Said gas oil cut to be hydrodesulphurized in accordance with the process of the invention contains 0.04% to 5% by weight of sulphur. It is advantageously derived from straight run gas oil, from a coking unit, from a visbreaking unit, from a steam cracking unit and/or from a fluid catalytic cracking unit. Said gas oil cut has a boiling point which is preferably in the range 250° C. to 400° C.

The hydrodesulphurization process of the invention is carried out under the following operating conditions: a temperature in the range 200° C. to 400° C., preferably in the range 330° C. to 380° C., a total pressure in the range 2 MPa to 10 MPa and more preferably in the range 3 MPa to 7 MPa with a ratio of the volume of hydrogen to the volume of hydrocarbon feed in the range 100 to 600 liters per liter and more preferably in the range 200 to 400 liters per liter, and an hourly space velocity in the range 1 to 10 $h^{-1}$, preferably in the range 2 to 8 $h^{-1}$. The HSV corresponds to the inverse of the contact time expressed in hours and is defined as the ratio of the volume flow rate of liquid hydrocarbon feed per volume of catalyst loaded into the reaction unit carrying out the hydrodesulphurization process of the invention.

The reaction unit carrying out the hydrodesulphurization process of the invention is preferably operated in fixed bed, moving bed or ebullated bed mode, preferably fixed bed.

The catalyst employed to carry out said hydrodesulphurization process of the invention produced in accordance with the preparation process of the invention preferably comprises a hydrodehydrogenating function selected from the group formed by combinations of cobalt-molybdenum, nickel-molybdenum and nickel-cobalt-molybdenum elements. The total quantity of hydrodehydrogenating elements, i.e. metal(s) from group VIII and metal(s) from group VIB and preferably molybdenum and cobalt and/or nickel, is in the range 7% to 50% by weight of oxides of metals from group VIB and VIII with respect to the total weight of the catalyst in the oxide form. The quantity of metal(s) from group VIB, preferably molybdenum, is in the range 4% to 40% by weight of oxide(s) of metal(s) from group VIB with respect to the total catalyst weight, preferably in the range 8% to 35% by weight and more preferably in the range 10% to 30% by weight of oxide(s) of metal from group VIB with respect to the total catalyst weight. The quantity of metal(s) from group VIII, preferably cobalt and/or nickel, is in the range 1% to 10% by weight of oxide(s) of metal(s) from group VIII with respect to the total catalyst weight, preferably in the range 1.5% to 9% by weight and more preferably in the range 2% to 8% by weight of oxide(s) of metal(s) from group VIII with respect to the total catalyst weight. Highly preferably, said catalyst comprises phosphorus with a quantity in said catalyst in the oxide form which is preferably in the range 0.1% to 20% by weight of $P_2O_5$.

In accordance with a second particular implementation, said hydrotreatment process of the invention is a process for the hydrotreatment (HDT) of a heavy hydrocarbon feed with a boiling point of 370° C. or more carried out in the presence of at least one sulphurized catalyst prepared using the process of the invention. Said hydrocarbon feed to be hydrotreated using the process of the invention advantageously contains 0.5% to 6% by weight of sulphur. It generally has more than 1% by weight of molecules with a boiling point of more than 500° C. It has a metals content, particular of nickel and vanadium, of more than 1 ppm by weight, preferably more than 20 ppm by weight, an asphaltenes content, defined as the fraction of the feed precipitating in heptane, or more than 0.05% by weight, preferably more than 1% by weight. The process for the hydrotreatment of a heavy hydrocarbon feed with a boiling point of 370° C. or more of the invention is generally intended to carry out both hydrodesulphurization and hydrodemetallization.

Said heavy hydrocarbon feed to be treated using the process is of the invention is selected from the following cuts, for example: vacuum distillates, atmospheric residues, straight run vacuum residues, deasphalted oils, residues from conversion processes such as those from a coking unit or from a fixed bed, ebullated bed or moving bed hydroconversion unit, and mixtures of each of these cuts. Said hydrocarbon feed to be hydrotreated is advantageously constituted either by one or more of said cuts or by one or more of said cuts diluted with a hydrocarbon fraction of a mixture of hydrocarbon fractions which may be selected from a light cycle oil (LCO), a heavy cycle oil (HCO), a decanted oil (DO), a slurry, products derived from the FCC process, or perhaps straight run products, gas oil fractions in particular those obtained by vacuum distillation and termed vacuum gas oil. Said heavy hydrocarbon feed to be hydrotreated may in some cases advantageously comprise one or more cuts derived from a coal liquefaction process as well as aromatic extracts.

The heavy hydrocarbon feed to be hydrotreated using the process of the invention in accordance with said second particular implementation may advantageously also be mixed with coal in the powder form, this mixture generally being termed a slurry. Said feed then advantageously includes by-products derived from the conversion of coal and is re-mixed with fresh coal. The quantity of coal in the heavy feed to be hydrotreated is such that the volume ratio of feed/coal is in the range 0.1 to 1, preferably in the range 0.15 to 0.3. The coal may contain lignite, it may be a sub-bituminous coal or it may be bituminous. Any other type of coal is suitable, both for carrying out the hydrotreatment process of the invention in a reaction unit functioning in fixed bed or in ebullated bed mode.

The process for the hydrotreatment of a heavy hydrocarbon feed of the invention is carried out under the following operating conditions: a temperature in the range 320° C. to 450° C., preferably in the range 350° C. to 410° C., a total pressure in the range 3 MPa to 30 MPa and more preferably in the range 10 MPa to 20 MPa, with a ratio of the volume of hydrogen per volume of hydrocarbon feed in the range 200 to 2000 liters per liter, more preferably in the range 500 to 1500 liters per liter, and an hourly space velocity in the range 0.5 to 5 $h^{-1}$, preferably in the range 0.1 to 0.8 $h^{-1}$. The HSV corresponds to the inverse of the contact time expressed in hours and is defined as the ratio of the volume flow rate of liquid hydrocarbon feed to the volume of catalyst loaded into the reaction unit carrying out the hydrodesulphurization process of the invention.

The process for the hydrotreatment of a hydrocarbon heavy feed of the invention is advantageously carried out in a reaction unit operating in fixed bed or in ebullated bed mode.

The catalyst employed to carry out said process for the hydrotreatment of a heavy hydrocarbon feed with a boiling point of 370° C. or more in accordance with the invention and produced using the preparation process of the invention preferably comprises a hydrodehydrogenating function selected from the group formed by cobalt-molybdenum, nickel-molybdenum and nickel-cobalt-molybdenum combinations of elements. The total quantity of hydrodehydrogenating elements, i.e. metal(s) from group VIII and metal(s) from group VIB and preferably molybdenum and cobalt and/or nickel is in the range 6% to 20% by weight of the oxides of the metals from group VIB and VIII with respect to the total weight of the catalyst in the oxide form. Highly preferably, said catalyst comprises phosphorus in a quantity in the catalyst in the oxide form which is preferably in the range 0.1% to 8% by weight of $P_2O_5$.

For these uses, the catalysts obtained by the process of the invention exhibit improved activity compared with prior art catalysts.

The following examples illustrate the invention without in any way limiting its scope.

EXAMPLES

Example 1 (Comparative)

Preparation of Pre-Catalysts C1, C2, C3, C4

A matrix composed of ultrafine tabular boehmite or alumina gel supplied by Condea Chemie GmbH was used to prepare the support for each of catalysts C1, C2, C3 and C4. This gel was mixed with an aqueous solution containing 66% by volume nitric acid (7% by weight of acid per gram of dry gel) then mixed for 15 minutes. At the end of this mixing, the paste obtained was passed through a die with cylindrical orifices with a diameter of 1.6 mm. The extrudates were dried overnight at 120° C., and calcined at 600° C. for 2 hours in moist air containing 50 g of water per kg of dry air. Support extrudates were obtained with a specific surface area of 300 $m^2/g$, determined using the BET method. X-ray diffraction analysis revealed that the support was uniquely composed of low crystallinity cubic gamma alumina. The pore volume of the support was equal to 0.65 ml/g.

The gamma alumina support in the form of extrudates obtained above was dry impregnated with an impregnation solution which was prepared by dissolving molybdenum oxide (24.34 g) and cobalt hydroxide (5.34 g) in a hot solution of phosphoric acid (7.47 g) in aqueous solution. After dry impregnation, the extrudates were left to mature in a water-saturated atmosphere for 12 h, and then dried overnight at 100° C. The pre-catalyst C1 was thus obtained (dry, non calcined form).

Next, a quantity of pre-catalyst C1 was calcined at 450° C. for 2 hours. The pre-catalyst C2 (calcined form) was obtained.

The final composition of the pre-catalysts C1 and C2, expressed in the form of the oxides, was thus as follows: $MoO_3$=22.5±0.2% (weight %), CoO=4.1±0.1 (% by weight) and $P_2O_5$=4.0±0.1 (% by weight). The Co/Mo molar ratio was 0.35 and the P/Mo molar ratio was 0.36.

The calcined pre-catalyst C2 was loaded into a traversed bed unit and sulphurized with straight run gas oil supplemented with 2% by weight of dimethyldisulphide. A HDS test of a mixture of straight run gas oil and a gas oil originating from catalytic cracking (LCO) was then carried out for 300 h. After the test, the spent pre-catalyst was discharged, recovered and washed with toluene under reflux, then separated into two batches. The first batch was regenerated in a combination furnace controlled by introducing increasing quantities of oxygen for each temperature stage, which limited the exothermicity linked to combustion of coke. The final regeneration stage was 450° C. The thus regenerated pre-catalyst was analyzed by X-ray diffraction: the absence of the line at 26°, characteristic of the presence of unwanted crystalline $CoMoO_4$, was observed. The solid obtained thus corresponded to the pre-catalyst C3. The second batch of washed spent pre-catalyst was regenerated in a muffle furnace at 450° C. without controlling the exothermicity linked to the coke combustion. X-ray diffraction analysis carried out after regeneration showed the presence of a fine line at 26°, characteristic of the presence of crystalline $CoMoO_4$. The solid obtained thus corresponded to the pre-catalyst C4. It had a highly pronounced bright blue colour characteristic of the presence of $CoMoO_4$.

The final composition of the pre-catalysts C3 and C4 expressed in the oxide form was identical to that of the pre-catalysts C1 and C2.

Example 2 (In Accordance with the Invention)

Preparation of Catalysts C1', C2', C3', C4'

Catalysts C1', C2', C3' and C4' were prepared in accordance with said step i1) followed by a step for drying ii) and a step for calcining iii) in accordance with the process of the invention.

Catalyst C1' was obtained by dry impregnation of said dried pre-catalyst C1 using an aqueous solution containing β-cyclodextrin (SIGMA-ALDRICH, 98% pure) in a molar ratio (Co+Mo)/β-cyclodextrin of 30, with a volume rigorously equal to the pore volume of the pre-catalyst C1. After the dry impregnation step, the extrudates were allowed to mature in a water-saturated atmosphere for 12 h then were dried overnight at 100° C. and calcined at 450° C. for 2 hours to obtain the catalyst C1' in accordance with the invention.

C2' was obtained from the pre-catalyst C2 using the same process.

C3' was obtained from the pre-catalyst C3 using the same process.

C4' was obtained from the pre-catalyst C4 using the same process.

The final composition of catalysts C1', C2', C3' and C4', expressed in the oxide form, was respectively identical to that of pre-catalysts C1, C2, C3 and C4.

Example 3 (In Accordance with the Invention)

Preparation of Catalyst C1"(Co-Impregnation)

Catalyst C1" was prepared in accordance with said step i2) followed by a drying step ii) and by a step for calcining iii) in accordance with the process of the invention.

The solution to carry out the co-impregnation was prepared by dissolving molybdenum oxide (24.34 g) and cobalt hydroxide (5.34 g) in a hot solution of phosphoric acid (7.47 g) in aqueous solution. After cooling to ambient temperature, β-cyclodextrin (SIGMA-ALDRICH, 98% pure) was added to the solution in a (Co+Mo)/β-cyclodextrin ratio of 30. The co-impregnation solution was thus obtained.

Catalyst C1" was obtained by dry impregnation of a gamma alumina support in the form of extrudates, prepared in accordance with Example 1, using the co-impregnation solution with a volume rigorously equal to the pore volume of the mass of said support. After the dry impregnation step, the extrudates were allowed to mature in a water-saturated atmosphere for 12 hours then they were dried overnight at 100° C. and calcined at 450° C. for 2 hours to produce the catalyst C1".

The final composition of the catalyst C1" expressed in the oxide form was thus as follows: $MoO_3$=22.5±0.2 (% by weight), CoO=4.1±0.1 (% by weight) and $P_2O_5$=4.0±0.1 (% by weight). The Co/Mo molar ratio was equal to 0.35 and the P/Mo molar ratio was equal to 0.36.

Example 4 (Comparative)

Preparation of Catalyst C5

Catalyst C5 was obtained by dry impregnation of said dried pre-catalyst C1 using an aqueous solution containing β-cyclodextrin (SIGMA-ALDRICH, 98% pure) in a (Co+Mo)/β-cyclodextrin molar ratio of 30, with a volume rigorously equal to the pore volume of the pre-catalyst C1. After the dry impregnation step, the extrudates were allowed to mature in a water-saturated atmosphere for 12 h then were dried overnight at 100° C. to obtain the dry catalyst C5. A drying temperature of 100° C. was not sufficient to decompose the β-cyclodextrin which remained in the catalytic composition.

The molybdenum, cobalt and phosphorus content of the catalyst C5 in the final composition, expressed in the form of oxides, was as follows: $MoO_3$=20.8±0.2 (% by weight), CoO=3.8±0.1 (% by weight) and $P_2O_5$=3.7±0.1 (% by weight). The Co/Mo molar ratio was 0.35 and the P/Mo molar ratio was equal to 0.36.

Example 5 (Comparative)

Preparation of Catalysts C6, C7 in the Presence of a Non-Cyclic Oligosaccharide: Lactose Lactose, or β-D-galactopyrannosyl(1→4)D-glucopyrannose [Gal β(1→4) Glc], is a diholoside (or disaccharide) with empirical formula $C_{12}H_{22}O_{11}$, composed of one molecule of β-D-galactose (Gal) and one molecule of α/β(3-D-glucose (Glc) bonded together via a β(1→4) oside bond. It is not a cyclic oligosaccharide. The developed formula for lactose is given below:

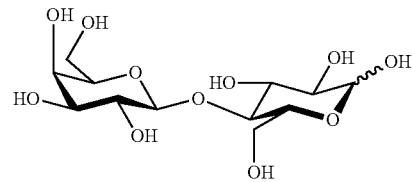

The dried catalyst C6 was obtained after determining the water take-up volume of the dried pre-catalyst C1 by dry impregnation of said dried pre-catalyst C1 with an aqueous solution containing lactose (SIGMA ALDRICH) in a (Co+Mo)/lactose molar ratio of 10, and with a volume rigorously equal to the pore volume of the pre-catalyst C1. After the dry impregnation step, the extrudates were allowed to mature in a water-saturated atmosphere for 12 hours then they were dried overnight at 100° C. to obtain the dried catalyst C6.

Catalyst C7 was obtained by calcining the catalyst C6 at 500° C. for 2 hours.

The molybdenum, cobalt and phosphorus content in the final composition of catalysts C6 and C7, expressed in the form of the oxides, was as follows: $MoO_3$=22.5±0.2 (% by weight), CoO=4.1±0.1 (% by weight) and $P_2O_5$=4.0±0.1 (% by weight). The Co/Mo molar ratio of catalysts C6 and C7 was 0.35 and the P/Mo molar ratio was equal to 0.36.

Example 6

Catalytic Performances of Pre-Catalysts C1, C2, C3 and C4 and of Catalysts C1', C2', C3', C4', C1", C5, C6 and C7 in Model Molecule Tests for Thiophene HDS A model feed containing 10% by weight of 2,3-dimethyl-but-2-ene and 0.33% by weight of 3-methylthiophene (i.e. 0.1% by weight of sulphur in the feed) was used to evaluate the catalytic performances of the various catalysts. The solvent used was heptane.

Catalysts C1, C2, C3 and C4 and catalysts C1', C2', C3', C4', C1", C5, C6 and C7 had already been sulphurized ex situ in the gas phase at 450° C. for 2 hours in a stream of $H_2S$ in hydrogen (15% by volume of $H_2S$ in $H_2$).

The hydrodesulphurization reaction was carried out in a closed Grignard type reactor under 3.5 MPa of hydrogen pressure, at 250° C. Each of the pre-catalysts C1, C2, C3 and C4 and catalysts C1', C2', C3', C4', C1", C5, C6 and C7 were placed in succession in said reactor. The effluents were sampled at different time intervals and analyzed by gas chromatography in order to observe the disappearance of the reagents.

The catalytic performances of the pre-catalysts C1, C2, C3 and C4 and the catalysts C1', C2', C3', C4', C1", C5, C6 and C7 were evaluated from the catalytic activity of a model molecule in HDS. The activity of the pre-catalysts and catalysts in the HDS of 3-methylthiophene is expressed as the rate constant $k_{HDS}$ of the hydrodesulphurization (HDS) reaction normalized to the volume of the catalyst in the sulphide form, assuming first order with respect to the sulphur-containing compounds.

The performances of the catalysts supported on alumina are given in Table 1. The values were normalized by taking the calcined catalyst C2 as the reference, $k_{HDS}=100$.

A comparison of the activities of the (pre) catalysts C1 (89), C2 (100), C6 (118) and C7 (98) shows that using a non-cyclic oligosaccharide such as lactose (prior art) when preparing the hydrotreatment catalyst is accompanied by an increase in HDS activity only if the catalyst is not subsequently calcined. In fact, the dried CoMoP/alumina pre-catalyst C1 had an activity of 89 as opposed to 100 for the calcined pre-catalyst C2. Adding lactose post-impregnation to C1 followed by drying (catalyst C6) produced an activity of 118. Catalyst C7 was obtained by calcining catalyst C6. Catalyst C7, free of the presence of lactose because of the calcining step, had an activity (98) which was close to and even slightly inferior to that of a calcined pre-catalyst prepared in the absence of lactose (100 for catalyst C2).

In contrast to the behaviour observed with a non-cyclic diholoside such as lactose, the use of a cyclic oligosaccharide such as β-cyclodextrin in the preparation of a catalyst resulted in a catalyst for which the HDS activity was only substantially improved if the catalyst underwent a heat treatment allowing the decomposition of said oligosaccharide before it was used in the reaction zone ($k_{HDS}=128$ for calcined catalyst C1' as opposed to $k_{HDS}=86$ for the dried catalyst C5). β-cyclodextrin does not bring about any gain in activity when it is still present in the catalyst at the time of its in situ sulphurization.

TABLE 1

Performances on model feeds of pre-catalysts C1, C2, C3, C4 and catalysts C1', C2', C3', C4', C1", C5, C6 and C7

| (Pre) catalyst | Initial catalyst | Organic additive | Heat treatment after adding organic additive | $k_{HDS}$ relative/C2 (%) |
|---|---|---|---|---|
| C1 (comparative) CoMoP/alumina, dried | — | — | — | 89 |
| C2 (comparative) CoMoP/alumina, calcined | — | — | — | 100 |
| C3 (comparative) CoMoP/alumina, mild regeneration | — | — | — | 90 |
| C4 (comparative) CoMoP/alumina, regenerated no exotherm. control | — | — | — | 75 |
| C1' (inv) CoMoP/alumina, calcined | C1 | β-cyclodextrin | Drying 100° C. Calcining 450° C. | 128 |
| C1" (inv) CoMoP/alumina, calcined | C1 | β-cyclodextrin | Drying 100° C. Calcining 450° C. | 125 |
| C2' (inv) CoMoP/alumina, calcined | C2 | β-cyclodextrin | Drying 100° C. Calcining 450° C. | 114 |
| C3' (inv) CoMoP/alumina, calcined | C3 | β-cyclodextrin | Drying 100° C. Calcining 450° C. | 103 |
| C4' (inv) CoMoP/alumina, calcined | C4 | β-cyclodextrin | Drying 100° C. Calcining 450° C. | 85 |
| C5 (comparative) CoMoP/alumina, dried | C1 | β-cyclodextrin | Drying 100° C. | 86 |
| C6 (comparative) CoMoP/alumina, calcined | C1 | lactose | Drying 100° C. | 118 |
| C7 (comparative) CoMoP/alumina, calcined | C1 | lactose | Drying 100° C. Calcining 450° C. | 98 |

A comparison of the results obtained for catalysts C1' and C1" demonstrates that the manner in which the metal(s) from group VIB and VIII, phosphorus and β-cyclodextrin are introduced has no effect on the HDS activity of the catalyst obtained provided that β-cyclodextrin is no longer present in the composition of the catalyst when used in the reaction unit.

A comparison of the results obtained for catalysts C1' and respectively C2' demonstrates that a catalyst prepared from a dried, respectively calcined, pre-catalyst then impregnated with a solution of β-cyclodextrin (step i1)) has a substantially improved HDS activity.

Catalysts C3' and C4' were regenerated CoMoP/alumina catalysts. C3' was regenerated under milder conditions than C4' which contained crystalline phases, including $CoMoO_4$, detectable in X-ray diffraction at 2theta=26°. Post-impregnation of the β-cyclodextrin on the pre-catalyst C3, respectively C4, followed by drying and calcining meant that the catalyst C3' (103), respectively C4' (85), could be produced which had improved HDS performances compared with the starting pre-catalyst C3 (90), respectively C4 (75).

Example 7

Preparation of Catalysts C8 (Not in Accordance) and C8' (in Accordance)

Catalyst C8 was obtained by dry impregnation of the gamma alumina support in the form of extrudates, prepared in accordance with Example 1, using an impregnation solution prepared by dissolving molybdenum oxide and nickel hydroxycarbonate in a hot solution of phosphoric acid in aqueous solution, the volume of said impregnation solution being rigorously equal to the pore volume of the mass of the alumina support. The concentrations of precursors in the impregnation solution were adjusted in order to deposit the desired quantities by weight of Mo, Ni and P on the alumina support. After the dry impregnation step, the extrudates were left to mature in a water-saturated atmosphere for 12 h then dried overnight at 90° C. A pre-catalyst was thus obtained which was divided into two batches. A first batch was calcined at 450° C. for 2 hours to produce a calcined catalyst C8. The final composition of the catalyst C8, expressed in the oxide form, was thus as follows: $MoO_3$=22.4±0.2 (% by weight), NiO=4.1±0.1 (% by weight) and $P_2O_5$=4.0±0.1 (% by weight).

Catalyst C8' was prepared by dry impregnation of the second batch of dried pre-catalyst with an aqueous solution of β-cyclodextrin dissolved in water, the volume of said solution being rigorously equal to the pore volume of the dried pre-catalyst. The (Co+Mo)/β-cyclodextrin molar ratio was 30. After a 3 hour maturation step at 20° C. in air then drying at 110° C. for 3 hours and finally calcining for 2 hours at 450° C., catalyst C8' was obtained.

The final composition of the catalyst C8' was identical to that of catalyst C8.

Example 8

Evaluation of Catalytic Performances of Catalysts C8 and C8' in the Hydrotreatment of Straight Run Gas Oil In situ sulphurization of catalyst C8, respectively catalyst C8', (30 cm³ of catalyst in the form of extrudates mixed with 10 cm³ of SiC with a granulometry of 0.8 mm) was carried out at 50 bars, at a HSV of 2 h⁻¹, with a (volume flow rate) ratio of $H_2$/HC at the inlet=400 Std l/l. The sulphurization feed (gas oil supplemented with 2% of DMDS, Evolution from Arkema) was introduced into the reactor in $H_2$ when it reached 150° C. After one hour at 150° C., the temperature was increased with a ramp-up of 25° C./hour to 220° C., then with a ramp-up of 12° C./hour until a constant temperature stage was reached at 350° C. and held for 12 hours.

After sulphurization, the temperature was reduced to 330° C. and the test feed was injected. The catalytic test was carried out at a total pressure of 5 MPa, with lost hydrogen (no recycling), a HSV of 2 h⁻¹, with a $H_2$/HC volume ratio at the inlet of 400 Std l/l ($H_2$ flow rate=24 Std l.h⁻¹, feed flow rate=60 cm³.h⁻¹, and at 330° C., 340° C. and 350° C. corresponding to three consecutive activity points.

In order to be able to evaluate the performances of catalysts C8 and C8' in HDS and to free the effluents from the presence of $H_2S$, the vessel containing the effluents was stripped with nitrogen in an amount of 10 L.h⁻¹.

The gas oil used here originated from a heavy Arab crude. It contained 0.89% by weight of sulphur, 100 ppm by weight of nitrogen, 23% by weight of aromatic compounds. Its weighted mean temperature (WMT) was equal to 324° C. and its density was equal to 0.8484 g/cm³. The WMT is defined as the ratio $(T_5+2T_{50}+4T_{95})/7$, where $T_x$ corresponds to the temperature at which "x"% by weight has distilled. The WMT thus takes into account the temperature at which 5% of the feed has vaporized, the temperature at which 50% by weight of the feed has vaporized and the temperature at which 95% by weight of the feed has vaporized.

The catalytic performances of catalysts C8 and C8' are given in Table 2. They are expressed as the relative activity, taking that of catalyst C8 to be equal to 100 and by considering that they are of the apparent order 1.5 with respect to the sulphur. The relationship linking the activity and the conversion for hydrodesulphurization (% HDS) is given by the following formula:

$$A_{HDS}=\{\sqrt{[100/(100\% \text{ HDS})]}\}-1$$

where % HDS corresponds to the conversion for hydrodesulphurization, HDS, and is defined by the formula below:

% HDS=$[(S_{feed}-S_{effluent})/S_{feed}]\times 100$; S represents sulphur

TABLE 2

Relative activity (at catalyst iso-volume) in HDS of straight run gas oil for catalysts C8 and C8'

| | $A_{HDS}$ relative to C8 | | |
|---|---|---|---|
| Catalyst | T = 330° C. | T = 340° C. | T = 350° C. |
| C8 | 100 | 100 | 100 |
| C8' | 116 | 117 | 119 |

The results shown in Table 2 demonstrate the large gain in HDS activity obtained using catalyst C8' prepared using the process of the invention compared with catalyst C8 prepared in the absence of a cyclic oligosaccharide.

During the test, the density of the effluents obtained at each temperature was measured at 15° C. The change in the densities as a function of temperature, deduced from the measurements taken during the test, provide an indication of the hydrodearomatization performance. The results are shown in Table 3 below. The reduction in the density of the effluent is linked to a more pronounced dearomatization.

TABLE 3

Change in density of effluent after hydrotreatment of straight run gas oil for catalysts C8 and C8'

| | Density of effluent | | |
|---|---|---|---|
| Catalyst | T = 330° C. | T = 340° C. | T = 350° C. |
| C8 | 0.8372 | 0.8361 | 0.8345 |
| C8' | 0.8365 | 0.8347 | 0.8328 |

The results shown in Table 3 demonstrate that catalyst C8' prepared using the process of the invention results in more effective dearomatization than that obtained with catalyst C8 prepared in the absence of a cyclic oligosaccharide. In fact, the conversion into compounds with a boiling point of less than 280° C. was less than 3%. The reduction in density was thus not due to cracking but to actual hydrogenation of the aromatic compounds.

More generally, the results obtained demonstrate that the catalyst C8' prepared using the process of the invention results in improved catalytic performances when used in the hydrotreatment of gas oil: in particular, the activity of the catalyst C8' in HDS and in hydrodearomatization is substantially improved compared with that of catalyst C8.

Example 9

Preparation of a Catalyst C9 (Not in Accordance) and a Catalyst C9' (In Accordance)

The alumina used in Example 1 was also used to produce a dried catalytic precursor with formulation NiCoMoP/alumina. The metallic precursors used were molybdenum trioxide, cobalt carbonate, nickel hydroxycarbonate and phosphoric acid. The impregnation solution was produced in one step by heating these precursors under reflux. The target quantity corresponded to a quantity expressed as the % by weight of oxide with respect to dry catalyst (after loss on ignition at 550° C.): NiO/CoO/MoO$_3$/P$_2$O$_5$ 1/2.3/15/4.4. Following dry impregnation, the extrudates were allowed to mature overnight in a water-saturated atmosphere then placed in an oven at 120° C. for 2 hours. The dried catalytic precursor was obtained thereby which was divided into two batches:

a first batch was calcined at 450° C. for 3 h to provide the catalyst C9 (not in accordance);

the second batch was impregnated with an aqueous solution containing β-cyclodextrin (SIGMA ALDRICH, 98% pure) with a (Co+Mo+Ni)/β-cyclodextrin molar ratio of 30 until moisture just appeared, indicating that the pores of the catalytic precursor had been filled with the solution containing the β-cyclodextrin. Next, maturation was carried out for 12 h followed by drying at 120° C. for 1 hour and calcining at 450° C. for 2 hours. The catalyst obtained thereby was the catalyst C9' in accordance with the invention.

Example 10

Preparation of a Catalyst C10 (Not in Accordance) and a Catalyst C10' (In Accordance)

Catalyst C10' was prepared in accordance with said step i3) followed by a drying step ii) and a calcining step iii) in accordance with the process of the invention.

The alumina used in Example 1 was used as the support for the catalyst C10'. The catalyst C10' was prepared in two successive impregnation steps. During the first dry impregnation step, the impregnation solution comprised β-cyclodextrin (SIGMA-ALDRICH, 98% pure) in a (Co+Mo)β-cyclodextrin molar ratio of 30 (based on the quantities of metals which were then impregnated in a second step). It was followed by maturation for 12 hours and drying at 120° C. for 1 h. The second dry impregnation step was then carried out. The metallic precursors used for this second impregnation step were ammonium heptamolybdate, cobalt nitrate and nickel nitrate. The volume of the solution corresponded to the water take-up volume of the alumina support modified by adding β-cyclodextrin (dry impregnation). The final target quantity corresponded to a quantity expressed as the % by weight of oxide with respect to the dry catalyst (after loss on ignition at 550° C.): NiO/CoO/MoO$_3$ 1/2.3/15. After impregnation of the metals, the extrudates were allowed to mature overnight in a water-saturated atmosphere then placed in an oven at 120° C. for 2 hours and finally they were calcined at 450° C. for 3 hours to provide catalyst C10' (in accordance).

Catalyst C10 was prepared in an analogous manner to C10' with the exception that the first dry impregnation step with β-cyclodextrin was omitted. The maturation, drying and calcining steps were similar to those for the preparation of C10'. The precursor C10 was thus obtained which had the following contents by weight: 1/2.3/15 of NiO/CoO/MoO$_3$ respectively.

Example 11

Evaluation of Catalytic Performances of Catalysts C9 and C10 (Not in Accordance) and C9' and C10' (in Accordance) in a Model Molecule Toluene Hydrogenation Test Carried Out in Cyclohexane Under Pressure and in the Presence of H$_2$S In applications such as the hydrotreatment of vacuum distillates and residues, the hydrodehydrogenating function plays a critical role because of the large quantity of aromatic and polyaromatic compounds in these feeds which have to be hydrogenated. The toluene hydrogenation test was thus used to examine the importance of catalysts intended for the hydrotreatment of such heavy feeds with a view to applications such as pre-treatment for catalytic cracking.

Catalysts C9 and C9', C10 and C10' described above were dynamically sulphurized in situ in a fixed traversed bed tube reactor for a pilot unit of the Microcat type (constructed by Vinci), the fluids moving from top to bottom. The hydrogenating activity measurements were carried out immediately after sulphurization under pressure and without letting air in with the hydrocarbon feeds which had sulphurized the catalysts.

The sulphurization and test feed was composed of 5.88% of dimethyldisulphide (DMDS), 20% of toluene and 74.12% of cyclohexane (by weight).

Sulphurization was carried out from ambient temperature to 350° C. with a temperature ramp-up of 2° C./min, a HSV of 4 h$^{-1}$ and H$_2$/HC=450 Nl/l. The catalytic test was carried out at 350° C. at a HSV of 2 h$^{-1}$ and a H$_2$/HC equivalent to that for sulphurization, taking a minimum of 4 effluents which were analyzed by gas chromatography.

Thus, the stabilized catalytic activities of equal volumes of catalysts C9 and C9', C10 and C10' were measured for the toluene hydrogenation reaction.

The detailed conditions for the activity measurement were as follows:

total pressure: 6.0 MPa;
toluene pressure: 0.37 MPa;
cyclohexane pressure: 1.42 MPa;
methane pressure: 0.22 MPa;
hydrogen pressure: 3.68 MPa;
H$_2$S pressure: 0.22 MPa;
Volume of catalyst: 4 cm$^3$ (2-4 mm extrudate length);
hourly space velocity: 2 h$^{-1}$;
sulphurization and test temperature: 350° C.

For each of these tests, the liquid effluent samples were analyzed by gas chromatography. The molar concentrations of unconverted toluene (T) and the concentrations of the hydrogenation products (methylcyclohexane (MCC6), ethylcyclopentane (EtCC5) and dimethylcyclopentanes (DMCC5)) were used to calculate the degree of hydrogenation of toluene, $X_{HYD}$, defined as:

$$X_{HYD}(\%) = 100 \times \frac{MCC6 + EtCC5 + DMCC5}{T + MCC6 + EtCC5 + DMCC5}$$

Since the toluene hydrogenation reaction was first order under the test conditions and the reactor behaved as an ideal piston reactor, the hydrogenating activity $A_{HYD}$ of catalysts C9 and C9', C10 and C10' was calculated using the formula:

$$A_{HYD} = ln(100/(100-X_{HYD}))$$

Table 4 below compares the relative hydrogenating activities of catalysts C9 and C9', C10 and C10'.

TABLE 4

Relative activity compared with catalyst C9 (not in accordance) for the toluene hydrogenation with catalysts C9', C10 and C10'

| Catalyst | Relative $A_{HYD}$ with respect to C9 (%) |
|---|---|
| C9 (comp) | 100 |
| C9' (inv) | 117 |

TABLE 4-continued

Relative activity compared with catalyst C9 (not in accordance) for the toluene hydrogenation with catalysts C9', C10 and C10'

| Catalyst | Relative $A_{HYD}$ with respect to C9 (%) |
|---|---|
| C10 (comp) | 84 |
| C10' (inv) | 107 |

The results shown in Table 4 demonstrate that the catalytic performances, in terms of hydrogenating activity, of catalyst C9' and of catalyst C10' prepared in the presence of a cyclic oligosaccharide are substantially improved over those obtained with catalyst C9 and catalyst C10 respectively.

This gain in hydrogenating activity is particularly advantageous for the hydrotreatment of heavy hydrocarbon feeds, for example for the hydrodesulphurization of residues or catalytic cracking pre-treatment.

The invention claimed is:

1. A process for preparing a catalyst comprising at least one metal from group VIII, at least one metal from group VIB and at least one support formed from at least one oxide, said process comprising, in succession, at least:
   i) at least one of i1)-i3):
      i1) bringing at least one pre-catalyst comprising at least said metal from group VIII, at least said metal from group VIB and at least said support into contact with at least one organic compound formed from at least one cyclic oligosaccharide composed of at least 6 α-(1,4)-bonded glucopyranose subunits;
      i2) bringing at least said support into contact with at least one solution containing at least one precursor of at least said metal from group VIII, at least one precursor of at least said metal from group VIB and at least one organic compound formed from at least one cyclic oligosaccharide composed of at least 6 α-(1,4)-bonded glucopyranose subunits; or
      i3) bringing at least said support into contact with at least one organic compound formed from at least one cyclic oligosaccharide composed of at least 6 α-(1,4)-bonded glucopyranose subunits followed by at least once bringing the solid derived from (i3) into contact with at least one precursor of at least said metal from group VIII and at least one precursor of at least said metal from group VIB;
   ii) drying at least once; and
   iii) heat treatment at least once to decompose said organic compound.

2. The preparation process according to claim 1, in which said catalyst comprises phosphorus.

3. The preparation process according to claim 1, in which said catalyst comprises a dopant that is boron or fluorine, used alone or as a mixture.

4. The preparation process according to claim 1, in which said metal from group VIB is molybdenum, tungsten or a mixture thereof.

5. A The preparation process according to claim 1, in which said metal from group VIII is cobalt, nickel or a mixture thereof.

6. The preparation process according to claim 1, in which said support is formed from at least one oxide comprising at least 50% by weight of alumina.

7. The preparation process according to claim 1, in which said organic compound is a cyclodextrin, substituted cyclodextrin, polymerized cyclodextrin or mixtures of cyclodextrins.

8. The preparation process according to claim 7, in which the cyclodextrins are α-cyclodextrin, β-cyclodextrin or γ-cyclodextrin respectively composed of 6, 7 and 8 α-(1,4)-bonded glucopyranose subunits.

9. The preparation process according to claim 7, in which the substituted cyclodextrins are hydroxypropyl beta-cyclodextrin or methylated beta-cyclodextrins.

10. The preparation process according to claim 1, in which said organic compound for carrying out i) is introduced such that the molar ratio {(metals from groups (VIII+VIB) in the oxide form present in the active phase of the catalyst obtained from iii)organic compound} is 10 to 300.

11. The preparation process according to claim 1, comprising at least one sulphurization iv) carried out after carrying out iii).

12. A process for the hydrotreatment of a hydrocarbon feed with a boiling point of 250° C. or more and comprising at least one heteroatom, said hydrotreatment process comprising bringing said hydrocarbon feed into contact with at least one sulphurized catalyst obtained in accordance with the preparation process according to claim 11.

13. The hydrotreatment process according to claim 12, carried out in the presence of hydrogen and under the following operating conditions: the temperature is 180° C. to 450° C., the total pressure is 0.5 to 30 MPa, the hourly space velocity is 0.1 to 20 h-1 and the hydrogen feed ratio, expressed as the volume of hydrogen measured under normal temperature and pressure conditions per volume of liquid feed is 50 Nl/l to 2000 Nl/l.

14. The hydrotreatment process according to claim 12, in which hydrodesulphurization of a gas oil containing 0.04% to 5% by weight of sulphur is carried out.

15. The hydrotreatment process according to claim 12, in which said hydrocarbon feed is a heavy hydrocarbon feed with a boiling point of 370° C. or more.

* * * * *